Dec. 7, 1965 T. F. SARAH 3,222,009
SPINNING REEL
Filed Aug. 8, 1963 4 Sheets-Sheet 1

INVENTOR.
THOMAS F. SARAH
BY Hamilton & Cook
ATTORNEYS

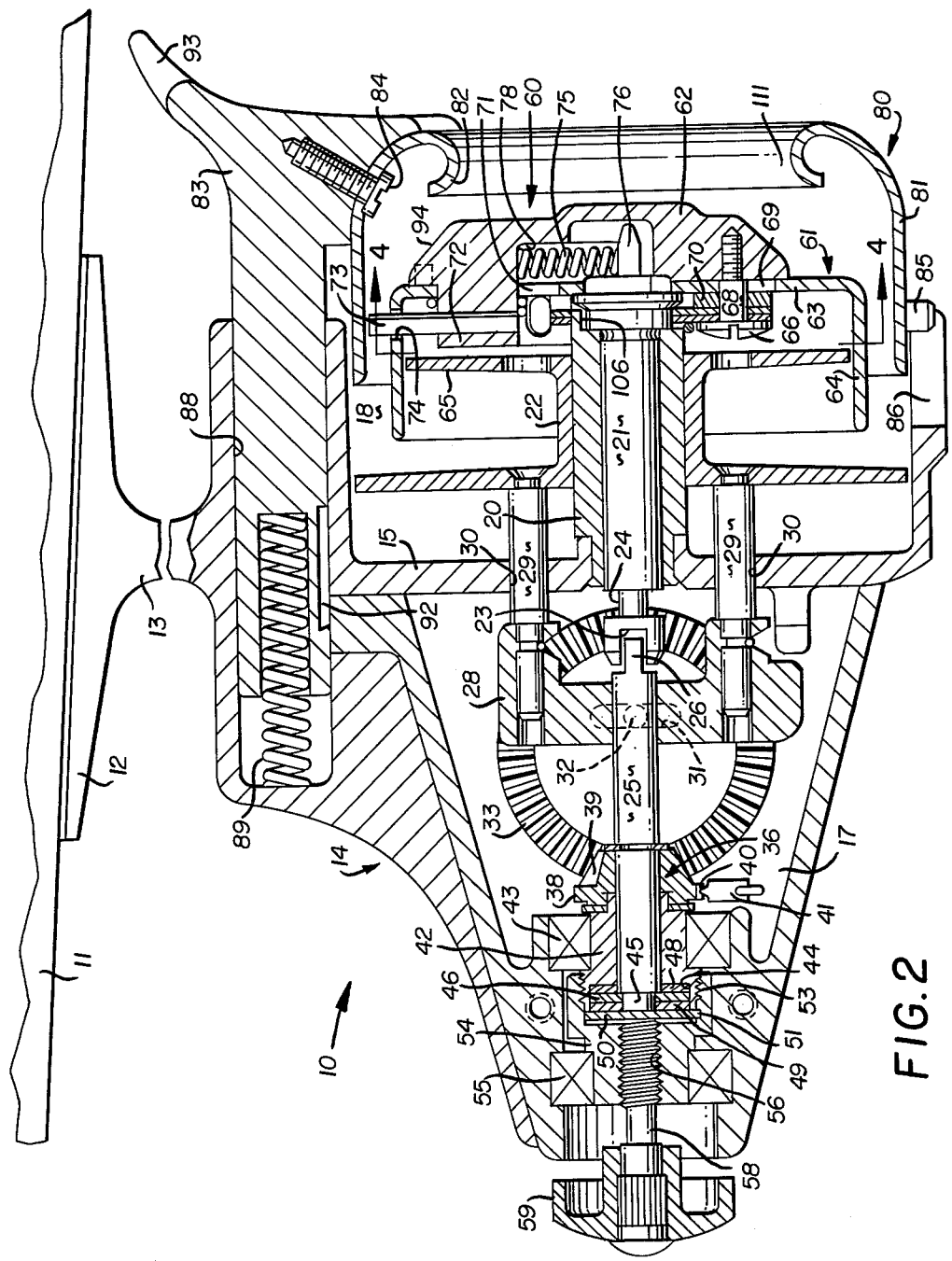

Dec. 7, 1965     T. F. SARAH     3,222,009
SPINNING REEL

Filed Aug. 8, 1963     4 Sheets-Sheet 4

INVENTOR.
THOMAS F. SARAH
BY Hamilton & Cook

ATTORNEYS

United States Patent Office 3,222,009
Patented Dec. 7, 1965

3,222,009
SPINNING REEL
Thomas F. Sarah, Akron, Ohio, assignor to Pflueger Corporation, Akron, Ohio, a corporation of Ohio
Filed Aug. 8, 1963, Ser. No. 300,790
10 Claims. (Cl. 242—84.21)

The present invention relates generally to fishing reels of the spinning type. More particularly, the present invention relates to fishing reels having a stationary spool and a radially enclosed flyer to wind the line onto the spool. Specifically, the invention relates to an undermounted spinning reel having a control operable by a finger on the casting hand to release the line for casting and snub the line at the proper time during the casting procedure to regulate the length of the cast.

The spinning reel with its stationary spool from which the line uncoils during casting has achieved widespread acceptance, particularly because it eliminates backlash which so frequently occurs with the type of reel in which the spool rotates to pay out the line during the cast.

Moreover, the spinning reel has garnered even more advocates because it is as readily usable on a casting rod, fly rod or specialized spinning rod.

Generally, all spinning reels may be classified according to three characteristics. They are open faced or closed face, finger snubbed or mechanically snubbed, and undermounted or overmounted.

The open face or closed face characteristics refer to the exposure of the spool. The closed face reels are usually provided with a cover cap, or the like, which encompasses the spool and permits exit of the line through an eyelet. Such a construction is advantageous in that the coils peeling off of the spool are confined within the cover cap so that the line reaches the first line guide on the fishing pole traveling in almost a straight line and therefore there is little or no opportunity for the line to tangle itself about the line guide. However, so confining the coils does add to the frictional resistance against the line as it pays out. In open face reel constructions there is no cover cap and the coils peeling off of the spool during the cast are not confined within the reel, thus reducing friction at the reel. However, the line is often still in a partial coil as it reaches the first line guide and the first line guide must be of increased diameter to reduce friction. With open face reels it is found necessary to provide at least the first line guide with sloping protectors extending from the pole to the outermost portion of the guide to prevent the line from coilingly encircling the guide and binding thereon.

Overmounted and undermounted refers to the position in which the reel is mounted with respect to the rod. When a fisherman is standing with his fishing rod in his casting hand and the tip of the rod is pointed forwardly away from him, if the reel is on the top or upper side of the rod he is using an overmounted reel. If the reel is underneath or on the lower side of the rod, he is using an undermounted reel.

The finger snubbed reel requires that the fisherman use one or more fingers to engage, or snub, the line both to control release and flight of the line. A mechanically snubbed reel utilizes a metal snubbing pin or a pinching of the line between two elements to prevent the line from paying off the spool until the desired time and to snub the line at the desired time after the cast to control the flight.

As an example of applying such classifications to a typical reel, the reel disclosed in my U.S. Letters Patent No. 2,911,165, is a closed face, overmounted, mechanically snubbed spinning reel.

Many fishermen prefer the balance and the ease with which the pole may be held during retrieving of the line when an undermounted reel is used. However, there are also those fishermen who prefer to control all of the operations of the reel, except winding, with the fingers on the casting hand, and when the reel is undermounted, two hands are generally required to prepare the reel for casting or else a complex lever arrangement must be employed.

It is therefore an object of the present invention to provide an undermounted, mechanically snubbed spinning reel in which the line can be snubbed and released at the start of the cast by mechanism actuated by the fingers of the casting hand.

It is another object of the present invention to provide a spinning reel, as above, in which the flight or length of the cast can also be controlled by mechanism operable by the fingers on the casting hand.

It is still another object of the present invention to provide a spinning reel, as above, in which the snubbing of the line occurs by pinching it against a cover cap which imparts a minimum frictional resistance to the line as it uncoils from the spool and yet sufficiently reduces the size of the coil leaving the reel so that there is little or no tendency for the line bindingly to engage the first line guide.

It is a further object of the present invention to provide a spinning reel, as above, in which a single slide lock is movable to multiple positions for progressively disassembling the reel.

It is a still further object of the present invention to provide a spinning reel, as above, in which the brake adjustment control is readily accessible.

It is an even further object of the present invention to provide a spinning reel, as above, which is relatively uncomplicated and economical to produce.

These and other objects of the invention, as well as the advantages thereof, over existing and prior art forms, will be apparent in view of the following detailed description of the attached drawings and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

In the drawings:

FIG. 2 is an enlarged longitudinal cross section taken substantially on line 2—2 of FIG. 1;

Figure 1:
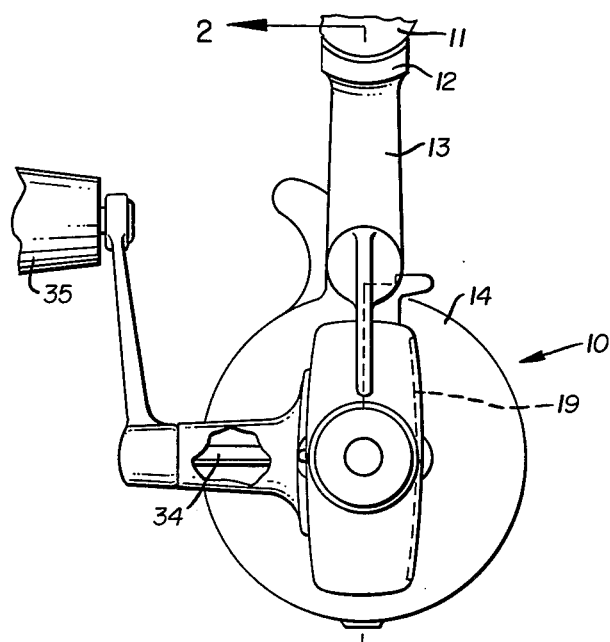
FIG. 1 is a rear elevation of a reel constructed in accordance with the subject invention.

In general, a spinning reel constructed according to the concept of the present invention is of the undermounted type and has a fixed spool carried within the frame. A rotatable flyer is mounted adjacent the outer, or line access, side of the spool. The flyer is comprised of a carrier and a pin holder radially slidable with respect to said carrier. The pin holder has a radially oriented pick-up pin fixed thereto. A snubbing cap generally in the shape of a cover cap except with a much larger opening encircles the spool and flyer and is mounted on the reel so as to be slidable axially of the spool by actuation of a finger operated slide plunger attached thereto. Actuation of the slide plunger snubs the line between the pin holder and the cap and, at the same time, radially shifts the pin holder to retract the pickup pin.

A frictional braking mechanism is adjustable from the rear of the reel where it is readily accessible. A lock bar along the side of the reel is slidable from locked position to three unlocked positions to permit successive removal of first, the snubbing cap; second, the flyer, and third, the spool.

Referring more particularly to the drawings, the improved reel, indicated generally by the numeral 10, is detachably mounted on the under side of a rod 11, as by the mounting shoe 12, in a well-known manner. An offset bar 13 spaces the reel housing 14 sufficiently below the mounting shoe 12 so that the fisherman may grasp the rod with his fingers between the housing 14 and shoe 12, and even with two fingers straddling the offset bar 13.

The housing 14 is divided by an integral partition wall 15 into a gear compartment 17 and a spool compartment 18. A cover plate 19 on the side of the rear, preferably flattened, portion of the housing containing the gear compartment 17 provides access thereto.

Fixed to and extending forwardly of the partition wall 15, is a cylindrical sleeve bearing bushing 20. Interiorly of bushing 20 is a flyer shaft 21 mounted for rotation. Exteriorly of the bushing 20 an axially slidable spool 22 is supported. The rear portion of flyer shaft 21 extends through the partition wall 12 into the gear compartment 17 and terminates in a slot 23.

Forwardly of the slot 23 is an annular groove 24 which will be more fully hereinafter described in conjunction with the take apart mechanism.

Axially aligned with the flyer shaft 21 is the drive shaft 25. A milled flat 26 on the forward end of the drive shaft 25 is insertably received within the slot 23 in the rear of the flyer shaft, thus forming the drive connection therebetween. Rearwardly of the flat 26, the drive shaft 25 is engaged by a traverse block 28 slidably carried thereon and attached to the spool 22 by a plurality of spool pins 29 which extend through appropriate bores 30 in the intervening partition wall 15. The traverse block 28 is provided with a slot 31 transversely to the axis of drive shaft 25 which is engaged by a pin 32 extending from the face of drive gear 33.

The drive gear 33 is of the standard type and is nonrotatably secured to a crank shaft 34 rotated by the usual crank handle 35.

The drive gear 33 meshes with a bevel gear pinion 36 secured, by a hereinafter described braking means, to the drive shaft 25 and is positioned rearwardly of the traverse range of block 28.

A radially extending annular shoulder 38 on pinion 36 rearwardly of the bevel gear teeth 39 is provided with teeth 40 around the periphery thereof which are engaged by an anti-reverse pawl 41.

Immediately to the rear of the pinion 36 a journal 42 is attached to the drive shaft 25 which is in turn supported in bearing 43. The rear face of the journal 42 is provided with a counterbore 44 into which the rearmost end of the drive shaft 25 extends. This end of drive shaft 25 also has a milled flat 45 on which is nonrotatably mounted a brake washer 46. The washer 46 is sandwiched between two additional brake discs 48 and 49, which are positioned within counterbore 44 but not otherwise connected to drive shaft 25 other than through their frictional contact with the brake washer 46.

A preferably metallic control washer 50 is also received in counterbore 44 and may be prevented from rotation by having lugs 51 on control washer 50 engaged with axial grooves 52 in the inner circumferential surface of counterbore 44.

A portion of the radially outer surface of journal 42 generally axially coextensive with the counterbore 44 is provided with threads 53 so that the rearmost journal 54, rotatably received in bearing 55, may be secured thereto. Journal 54 is provided with a threaded bore 56 for adjusting screw 58, the control knob 59, for which is positioned exteriorly of the rearmost portion of the housing 14.

The flyer, indicated generally by the numeral 60, is comprised with a cup-shaped carrier 61 and a pin holder, or slide 62 and is nonrotatably mounted on the forward end of the flyer shaft 21 for rotation therewith. Specifically, the base 63 of the cup-like carrier 61 is swaged, or otherwise suitably attached to, flyer shaft 21. The skirt 64 of the carrier 61 extends rearwardly over the front flange 65 of the spool 22.

The pin holder 62 is secured to the carrier 61 by cap screw 66. The shank 68 of screw 66 passes through a radially oriented elongate guide slot 69 in the carrier 61 and secures the holder 62 to carrier 61. The washer 70 on the shank 68 of screw 66 is of greater diameter than the lateral span of the slot 69 to engage the base 63 of the carrier 61 between the washer 70 and the holder 62 sufficiently to mount the holder 62 on the carrier 61 but not so tightly as to prevent radial translation of the holder 62 with respect to the carrier 61 in the radial direction of the slot 69.

On the diametrically opposite side of flyer shaft 21 from the guide slot 69, a radially oriented access slot 71 is provided in the base 63 of carrier 61. Slot 71 is aligned with guide slot 69 and receives therethrough a spur 72 which extends rearwardly from the holder 62. The pick-up pin 73 is mounted in, and extends radially outwardly of spur 72 through a bore 74 in the skirt 64 of the carrier 61. The pick-up pin 72 normally extends outwardly of the carrier 61, as shown in FIG. 2, by the action of the compression spring 75 interposed between an extension 76 on the flyer shaft 21 and a shouldered recess 78 on the holder 62.

Radially outwardly of the spool 22 and flyer 60 is an annular snubbing cap, indicated generally by the numeral 80. Cap 80, which comprises a skirt portion 81, positioned generally concentrically with the skirt 64 on carrier 61, and a radially inwardly directed annular snubbing collar 82, is secured to a slide plunger 83, as by screw 84. The cap 80 is stabilized by a guide stud 85 extending radially outwardly of the skirt portion 81 into a receiving slot 86 in housing 14. Plunger 83 is slidably received in a bore 88 provided in the housing 14 and oriented parallel to the flyer shaft 21. A compression spring 89 at the base of bore 88 is engaged by and acts to bias the plunger 83 forwardly and outwardly. The outer movement of plunger 83 is limited by a lock spur 90 (FIG. 3) which engages the limit shoulder 91 of an axially aligned slot 92 provided in plunger 83.

The plunger 83 also has a trigger 93 which extends generally upwardly of plunger 83 and is engageable by the forefinger of the fisherman. The finger pressure against trigger 93 acts against spring 89 and slides plunger 83 rearwardly. The cap 80 which is attached to plunger 83 moves therewith and the annular radially inwardly disposed collar 82 engages a truncated conical cam surface 94 on the forward face of the pin holder 62. The action of the collar 82 against the cam surface 94 slides the pin holder 62 radially with respect to the carrier 61 until the cam surface 94 is centered with respect to collar 82.

Figure 3:
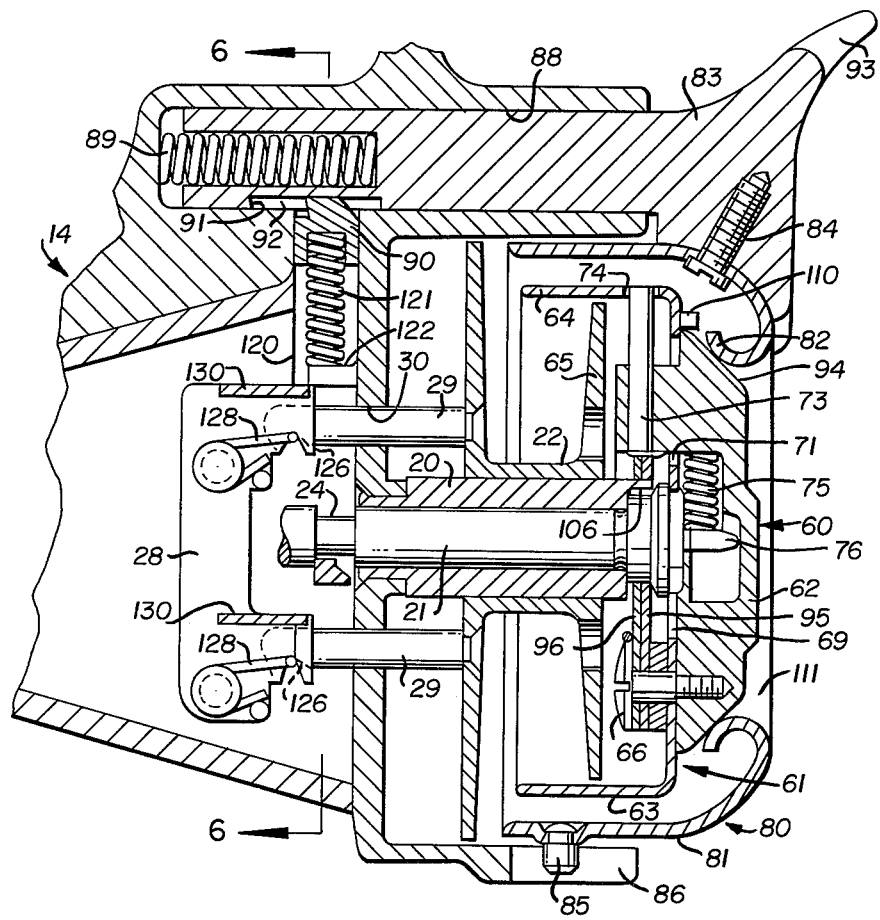
FIG. 3 is an area of FIG. 2 with the finger control actuated and showing in detail the take apart mechanism.
Figure 5:
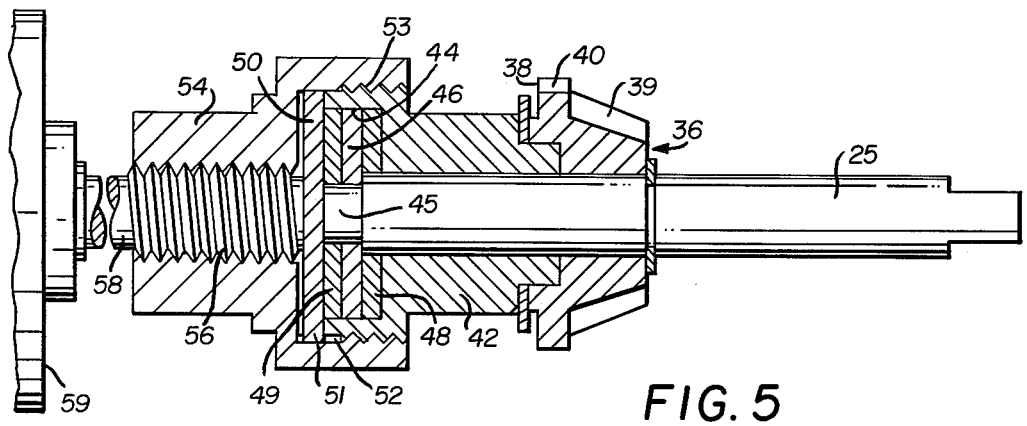
FIG. 5 is an enlarged area of FIG. 2 showing the brake control.

As is best shown in FIG. 3, when the cam surface 94 and the collar 82 are centered, the holder 62 is radially translated (from the position shown in FIG. 2) to compress spring 75 and withdraw the pick-up pin 73 so that it no longer extends radially outwardly of the skirt 64 on the carrier 61.

When the holder 62 is thus translated a latching mechanism thereon locks the holder 62 with the pick-up pin 73 retracted until the crank handle 35 is cranked to retrieve the line.

Figure 4:
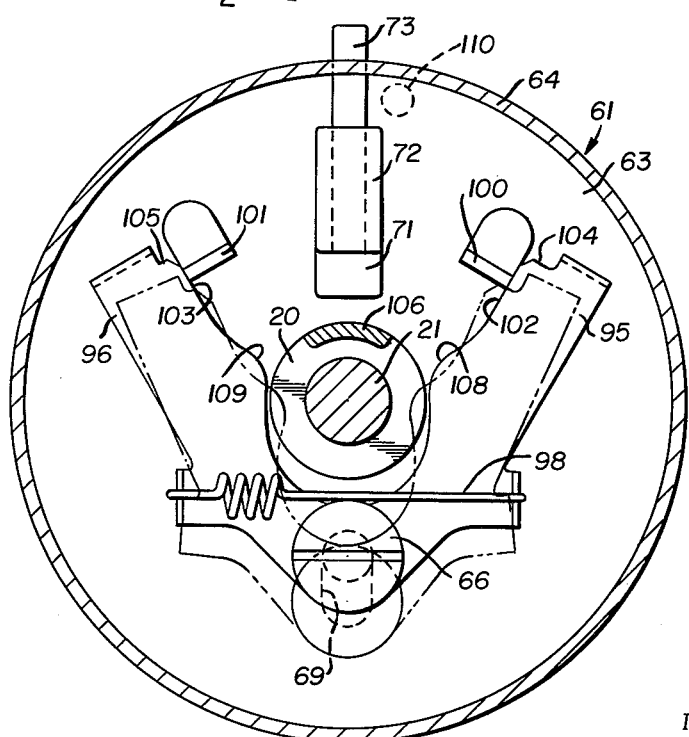
FIG. 4 is an enlarged cross section taken substantially on line 4—4 of FIG. 2.

As best shown in FIG. 4, the latching mechanism comprises two latch bars 95 and 96 pivotally mounted on cap screw 66, preferably on the opposite side of washer 70 from the base 63 of carrier 61. See FIG. 3. The latch bars 95 and 96 extend outwardly of screw 66 in planes oriented transversely of flyer shaft 21 with one positioned on either side of, and adjacent to, the flyer shaft 21. A tension spring means 98 is connected between the latch bars 95 and 96 biasingly to urge them toward each other.

Fixedly positioned on the carrier 61 are lock lugs 100 and 101. Lock lug 100 is positioned to interact with the latch bar 95 and lock lug 101 is positioned to interact with latch bar 96. When the pick-up pin is in extended position—i.e., when it extends radially outwardly of the skirt 64 on carrier 61—lock lugs 100 and 101 engage respective blocking surfaces 102 and 103 on latch bars 95 and 96. This permits free rotation of carrier shaft 21.

However, when the holder 62 is translated to pin retracted position, the latch bars 95 and 96, being attached to screw 66 move therewith. This causes the lock blocking surfaces 102 and 103 to slide along their respective lock lugs 100 and 101 until the latch notches 104 and 105 are reached, and the biasing action of tension spring 98 can snap one or both of the latch notches 104 and 105 into locking engagement with lock lugs 100 and 101, respectively, as shown in phantom in FIG. 4.

An axial extension of the forward end of fixed bushing 20, as best shown in FIGS. 2 and 3, acts as the kickout for the latch bars. This kickout extension 106 is engaged by the unlocking cam surfaces 108 and 109 on the respective latch bars 95 and 96 when the flyer shaft is rotated to swing the engaged latch bar outwardly disengaging them from the lock lugs and permitting the compression spring 75 to shift the holder 62 so that the pick-up pin 73 will return to extended position.

It should be noted that while it is possible for the flyer 69 to be positioned such that the kickout extension 106 may prevent the latch notch on one of the latch bars from engaging its respective lock lug when the pick-up pin 73 is retracted, it is of such selected size that it is impossible to block both latch bars. It should be further noted that the radial dimension from the pivot point of screw 66 to the latch notch 104 on latch bar 95 is greater than the radial dimension from the screw 66 to the latch notch 105 on latch bar 96. This way an escapement-like progressive release of the two latch bars is accomplished. This assures that the holder 62 will be released upon a single rotation of the flyer shaft 21.

For example, should both latch bars 95 and 96 simultaneously engage their respective lock lugs 100 and 101, as shown in phantom in FIG. 4, rotation of the flyer shaft 21 would first bring the release cam surface 108 on latch bar 95 into contact with kickout extension 106, disengaging the latch notch 104 from locking lug 100. At this moment, because of the differential radial dimension of the latch notches 104 and 105, the holder would translate sufficiently to bottom the notch 105 on latch bar 96 against lock lug 101. This translation is sufficient to cause the blocking surface 102 on latch bar 95 to abut the lock lug 100. Further rotation of the flyer shaft 21 brings the release cam surface 109 on latch bar 96 into engagement with kickout extension 106 and the latch notch 105 is disengaged from lock lug 101. At this point, the pin holder 62 may freely translate until the pick-up pin is fully extended and the shank 68 of screw 66 has engaged the end of slot 69.

The fisherman would operate this reel as follows. To cast the lure the fisherman would apply finger pressure to trigger 93 depressing the plunger 83. This would bring the collar 82 against the conical cam surface 94 on pin holder both to translate the holder 62 until the pick-up pin 73 is retracted and to pinchingly engage the line therebetween. The trigger is thus maintained until that moment during the cast when the fisherman desires to release the line. By releasing this finger pressure against the trigger pinching of the line is removed, but the pick-up pin 73 remains retracted by engagement of one or both latch bars 95 and 96 with their respective lock lugs 100 and 101, and the line can freely uncoil or peel off the spool.

If desired the fisherman may stop the cast at any time during the flight of the lure by simply again depressing the plunger 83 through finger pressure to trigger 93.

When rewinding is started by turning the crank handle 35, the flyer shaft 21 rotates the carrier 61 and pin holder 62 so that the release cam surfaces 108 and 109 on the latch bars 95 and 96, respectively, engage the kickout extension 106, as described above, to extend the pick-up pin to catch the line and wind it on the spool.

In FIG. 3 a snub post 110 is shown extending forwardly from the base 63 of carrier 61. Such an auxiliary snubbing device may be useful as a supplement to the pinching action of the line between the cam surface 94 on the holder 62 and the collar 82 on cap 80 preparatory to cast. With or without an auxiliary snubbing post 110, the present reel utilizes a mechanical snubbing of the line inherent to closed face reels, but at the same time permits the guiding opening 111 in cap 80 to be of considerably larger diameter than the eyelet in most cover caps, thus reducing the friction against the line as it pays off of the reel while tending to reduce the coil size of the line to reduce the possibility of the line tying up on the first line guide on the fishing pole.

The particular brake mechanism of the present reel is most advantageous. Proper adjustment of the brake permits the fisherman to play and land fish much heavier than the test of the line he is using. The knob 59 on the brake mechanism of the present reel is at the rear of the reel where it is readily accessible and easily found by the fisherman's hand even while watching the tip of the rod and the line.

Figure 6:
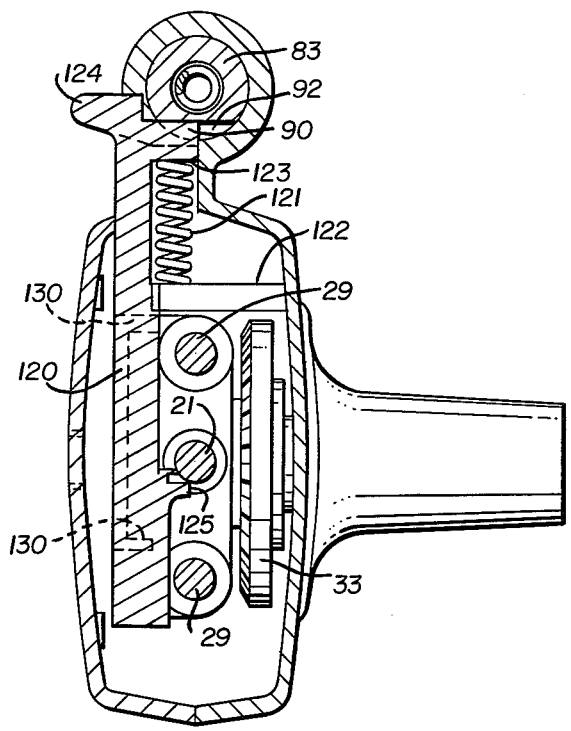
FIG. 6 is a cross section taken substantially on line 6—6 of FIG. 3.

The present reel also has a unique take-apart feature. A lock bar 120, as best seen in FIG. 6, is vertically—i.e., transversely the axis of flyer shaft 21—slidable in housing 14. Bar 120 is located just rearwardly of partition 15 in the forward portion of gear compartment 17 and is upwardly biased by the action of a compression spring 121 positioned between ledge 122 in partition 15 and a shoulder 123 on the lock bar 120. Extending outwardly of housing 14 is the lock bar actuating lip 124 which is located near the top of the housing just rearwardly of the offset bar 13 where it is readily accessible for taking the reel apart.

The lock bar 120 is moved downwardly by pressure against the actuating lip 124. During the initial downward movement of lock bar 120 the lock spur 90 attached to lock bar 120 is retracted from slot 92 in plunger 83, thus permitting removal of the plunger 83 and the cap 80 attached thereto.

Further downward movement of lock bar 120 disengages a tooth 125 from the annular groove 24 in flyer shaft 21. This permits the flyer 69 and the shaft 21 attached thereto to be extracted forwardly out of the housing.

Finally, a further incremental downward movement applied to lock bar 120 disengages the spool pins 29 from the traverse block 28. As best shown in FIG. 2, the spool pins are inserted in corresponding bores in the traverse block 28. Each spool pin 29 has a notch 126 which receives the end of a wire spring 128 attached to the traverse block 28. A flange 130 is provided on the lock bar 120 for each spring 128 and is so positioned that the last portion of the downward movement of bar 120 causes the flanges 130 to contact their respective wire springs 128 and release them from their receiving notch 126 to permit removal of the spool 22 from the housing 14.

It should thus be apparent that the subject invention provides an undermounted, closed face, mechanically snubbed reel that accomplishes the objects of the invention.

What is claimed is:

1. In a spinning reel having a housing and a normally nonrotatable line spool, a flyer rotatably mounted adjacent to the spool, said flyer comprising a carrier and a holder, said carrier fixed to a selectively rotatable shaft, said holder mounted on said carrier for radial movement, a pick-up pin attached to said holder and normally extending radially outwardly of said carrier but retractable with respect thereto, a cap supported on said housing and positioned radially of said flyer, said cap having a guide opening for permitting the passage of the line therethrough outwardly and off the end of the spool, means mounting said cap for movement axially with respect to said flyer, means on said cap to engage said holder upon axially rearward movement of said cap, said engaging of the cap with said holder snubbing the fishing line therebetween and moving said holder radially with respect to said carrier to retract said pick-up pin.

2. In a spinning reel having a housing and a normally nonrotatable line spool, a flyer rotatably mounted adjacent to the spool, said flyer comprising a carrier and a holder, said carrier fixed to a selectively rotatable shaft, said holder mounted on said carrier for radial movement, a pick-up pin attached to said holder and normally extending outwardly radially of said carrier but retractable with respect thereto, a cap supported on said housing and positioned radially of said flyer, said cap having a guide opening for permitting the passage of the line therethrough outwardly and off the end of the spool, means mounting said cap for movement axially with respect to said flyer, means on said cap to engage said holder upon axially rearward movement of said cap, at least one latch bar on said holder, a lock lug on said carrier, said engaging of the cap with said holder snubbing the fishing line therebetween, moving said holder radially with respect to said carrier to retract said pick-up pin, and causing said latch bar lockingly to engage said lock lug to retain said pick-up pin in retracted position, and means to disengage said latch bar from said lock lug upon rotation of said shaft.

3. In an undermounted spinning reel having a housing and a normally nonrotatable line spool, a carrier adjacent and forwardly of said spool, said carrier having a base fixed transversely to the axis of a selectively rotatable shaft, a skirt on said carrier extending concentrically of said shaft adapted to guide the line on to and off of the spool, a pin holder mounted on the base of said carrier for radial movement with respect thereto, a pick-up pin attached to said holder and normally extending radially outwardly of the skirt on said carrier but retractable with respect thereto, a cap positioned radially of said carrier having a guide opening for passing the line outwardly and off the end of the spool, means mounting said cap for movement axially with respect to said carrier, means on said cap to engage said holder upon axially rearward movement of said cap, at least one latch bar on said holder, a lock lug on said carrier, said engaging of the cap with said holder snubbing the fishing line therebetween, moving said holder radially with respect to said carrier to retract said pick-up pin, and causing said latch bar lockingly to engage said lock lug to retain said pick-up pin in retracted position, and means to disengage said latch bar from said lock lug upon rotation of said shaft.

4. In an undermounted spinning reel having a housing and a normally nonrotatable line spool, a carrier adjacent and forwardly of said spool, said carrier having a base fixed transversely to the axis of a selectively rotatable shaft, a skirt on said carrier extending concentrically of said shaft adapted to guide the line onto and off of the spool, a pin holder mounted on the base of said carrier for radial movement with respect thereto, a pick-up pin attached to said holder, spring means normally biasing said holder so that said pick-up pin extends radially outwardly of the skirt on said carrier, a lock lug on said carrier base, at least one latch bar swingingly mounted on said holder and biasingly urged toward said lock lug, a cap positioned radially of said carrier having a guide opening for permitting the line to pass therethrough outwardly and off the end of the spool, second spring means associated with said cap, means mounting said cap for movement axially rearwardly with respect to said carrier against the bias of said second spring means upon application of manual pressure, means on said cap to engage said holder upon rearward movement of said cap, said engaging of the cap with said holder snubbing the fishing line therebetween, moving said holder radially with respect to said carrier to retract said pick-up pin, and causing said latch bar lockingly to engage said lock lug and retain said pick-up pin in retracted position, and means to disengage said latch bar from said lock lug upon rotation of said shaft.

5. In an undermounted spinning reel having a housing, a forwardly extending stationary bushing mounted in said housing, a kickout extension on the forward end of said bushing, a normally nonrotatable line spool carried on the exterior of said bushing, a selectively rotatable shaft journaled interiorly of said bushing and extending forwardly thereof, a carrier, said carrier having a base and a skirt, said base nonrotatably secured to said shaft, said skirt extending rearwardly of said base concentrically of said shaft, a pin holder mounted on said base for radial movement with respect thereto, a pick-up pin attached to said holder, spring means normally biasing said holder so that said pick-up pin extends radially outwardly of said carrier skirt, at least one lock lug on said carrier base, at least one latch bar swingingly mounted on said holder, means urging said latch bar toward said lock lug, said latch bar having a latch notch, a blocking surface and an unlocking cam, said blocking surface engaging said lock lug when said pick-up pin is extended radially outwardly of said carrier skirt, a cap positioned radially of said carrier and having a guide opening for permitting the line to pass therethrough outwardly and off the end of the spool, second spring means associated with said cap, means mounting said cap for movement axially rearwardly with respect to said carrier against the bias of said second spring means upon application of manual pressure, means on said cap to engage said holder upon a rearward movement of said cap, said engaging of said cap and holder snubbing the line therebetween, moving said holder radially with respect to said carrier to retract said pick-up pin, and engaging the latch notch on said latch bar with said lock lug to maintain said holder with the pick-up pin in retracted position, rotation of said shaft causing the unlocking cam on said latch bar to engage the kickout extension on said fixed bushing and swing said latch bar out of engagement with said lock lug to permit radial movement of said holder for extension of said pick-up pin.

6. In an undermounted spinning reel having a housing and a normally rotatable line spool, a fly rotatably mounted adjacent to the spool, said flyer comprising a carrier member and a pin holder member, said carrier member fixed to a selectively rotatable shaft, said pin holder member mounted on said carrier member for radial movement with respect thereto, a pick-up pin attached to said pin holder member and normally extending radially outwardly of said carrier member but retractable with respect thereto, a cap supported on said housing and positioned radially of said flyer, said cap having a guide opening for passing the line therethrough outwardly and off the end of the spool, means mounting said cap for movement axially with respect to said flyer, means on said cap to engage said holder upon axially rearward movement of said cap, a lock means operable between said flyer members, said lock means comprising a latch bar on one of said members and a lock lug on the other said member, rearward movement of said cap engaging said holder member and snubbing the line therebetween and moving said holder member radially with respect to said carrier member to retract said pick-up pin and cause said latch bar lockingly to engage said lock lug and retain said pick-up pin in retracted position, and means to disengage said latch bar from said lock lug upon rotation of said shaft.

7. In an undermounted spinning reel having a housing, a forwardly extending stationary bushing mounted in said housing, a kickout extension on the forward end of said bushing, a normally nonrotatable line spool carried on the exterior of said bushing, a selectively rotatable shaft journaled interiorly of said bushing and extending forwardly thereof, a carrier, said carrier having a base and a skirt, said base nonrotatably secured to said shaft forwardly of said bushing, said skirt extending rearwardly of said base concentrically of said shaft, a pin holder mounted on said base for radial movement with respect thereto, a pick-up pin attached to said holder, spring means normally biasing said holder so that said pick-up pin extends radially outwardly of said carrier skirt, a pair of latch bars swingingly mounted on said holder, a lock lug for each latch bar on said carrier, each said latch bar biasingly urged toward its respective lock lug and having a latch notch, a blocking surface and an unlocking cam, the blocking surfaces engaging said lock lugs when said pick-up pin is extended, a cap positioned radially of said carrier and having a guide opening for permitting the line to pass therethrough outwardly and off the end of the spool, second spring means associated with said cap, means mounting said cap for movement axially rearwardly with respect to said carrier against the bias of said second spring means upon application of manual pressure, means on said cap to engage said holder upon a rearward movement of said cap, said engaging of said cap and holder snubbing the line therebetween, moving said holder radially with respect to said carrier to retract said pick-up pin, and engaging the latch notch on at least one said latch bar with its respective lock lug to maintain said holder with the pick-up pin in retracted position, rotation of said shaft causing said unlocking cam to engage the kickout extension and disengage the latch notches from the lock lugs.

8. A spinning reel, as defined in claim 7, in which the latch notch on one latch bar and its coacting lock lug are at a different spaced interval than the latch notch on the other latch bar and its coacting lock lug along the radial direction of movement of the pin holder with respect to the carrier in order to provide an escapement-like release of said latch notches from their lock lugs.

9. A spinning reel as defined in claim 7, in which the latch bars are mounted on a common pivot and in which the latch notch on one said latch bar is radially closer to said pivot than the latch notch on the other said latch bar to provide an escapement-like release of the latch notches from their respective lock lugs.

10. In an undermounted spinning reel having a housing, a normally nonrotatable line spool, a flyer rotatably mounted adjacent to the spool and a cap radially of said flyer, means mounting said cap for movement to said flyer, a locking take-apart mechanism, said locking take-apart mechanism being operable progressively to release the cap, flyer and spool, and comprising a lock bar with an actuating lip exteriorly of the housing, said cap being attached to a plunger slidable in said housing, a lock spur on said lock bar selectively disengageable from said plunger, said flyer nonrotatably mounted to a shaft, a tooth on said lock bar selectively disengageable with said shaft after said lock spur has disengaged said plunger to permit said shaft to be axially removed from said housing, spool pins extending from said spool to a traverse block, spring means attaching said spool pins to said traverse block, at least one flange on said lock bar for selectively disengaging said spring means from said spool pins after the tooth has disengaged said shaft to permit the spool to be axially removed from said housing.

References Cited by the Examiner

UNITED STATES PATENTS

| | | | |
|---|---|---|---|
| 2,602,603 | 7/1952 | Blissit | 242—84.2 |
| 2,711,292 | 6/1955 | Taggart et al. | 242—84.21 |
| 2,911,165 | 11/1959 | Sarah | 242—84.2 |
| 2,991,957 | 7/1961 | Hull | 242—84.5 |
| 3,025,020 | 3/1962 | Sarah | 242—84.21 X |
| 3,074,664 | 1/1963 | Beger | 242—84.2 |
| 3,105,650 | 10/1963 | Kuether | 242—84.2 |
| 3,108,761 | 10/1963 | Frode | 242—84.2 |
| 3,108,762 | 10/1963 | Murvall | 242—84.2 |
| 3,120,357 | 2/1964 | Wood | 242—84.5 |

FOREIGN PATENTS 558,986   6/1958   Canada.

MERVIN STEIN, *Primary Examiner.*

UNITED STATES PATENT OFFICE
CERTIFICATE OF CORRECTION

Patent No. 3,222,009

December 7, 1965

Thomas F. Sarah

It is hereby certified that error appears in the above numbered patent requiring correction and that the said Letters Patent should read as corrected below.

Column 4, line 29, for "72" read -- 73 --; column 5, line 71, for "this" read -- his --; column 6, line 18, for "guiding" read -- guide --; column 8, line 53, for "fly" read -- flyer --; column 10, line 10, after "movement" insert -- axially with respect --.

Signed and sealed this 6th day of December 1966.

(SEAL)
Attest:

ERNEST W. SWIDER
Attesting Officer

EDWARD J. BRENNER
Commissioner of Patents